United States Patent

Karasawa et al.

[11] Patent Number: 4,774,423
[45] Date of Patent: Sep. 27, 1988

[54] CLUTCH FOR WIPER MOTOR OVERLOAD

[75] Inventors: Kazuo Karasawa, Sagamihara; Yosinori Ishii; Yasuo Ohashi, both of Yokohama, all of Japan

[73] Assignees: Nissan Motor Co., Ltd.; Jidosha Denki Kogyo Kabushiki Kaisha, both of Japan

[21] Appl. No.: 3,763

[22] Filed: Jan. 16, 1987

[30] Foreign Application Priority Data

Jan. 17, 1986 [JP] Japan ................................. 61-7635

[51] Int. Cl.$^4$ ........................ B60S 1/26; F16D 43/20; H02K 7/102
[52] U.S. Cl. .................................. 310/78; 15/250.31; 192/43.2; 310/83
[58] Field of Search ........... 15/250.12, 250.16, 250.30, 15/250.31, 250.34; 192/41 R, 43, 43.1, 43.2, 45, 56 R; 310/78

[56] References Cited

U.S. PATENT DOCUMENTS

| 2,600,622 | 6/1952 | Dahlgren | 15/250.31 |
| 3,973,449 | 8/1976 | Berlinger | 15/250.3 |
| 3,978,542 | 9/1976 | van Eckelen | 15/250.34 |
| 4,566,570 | 1/1986 | Geisthoff | 192/56 R |

FOREIGN PATENT DOCUMENTS 59-8856  1/1984  Japan .

Primary Examiner—Patrick R. Salce
Assistant Examiner—D. L. Rebsch
Attorney, Agent, or Firm—Leydig, Voit & Mayer

[57] ABSTRACT

A wiper motor assembly including an electric motor and a speed reduction gear which are combined as a unit. A clutch assembly is incorporated with the speed reduction gear to cut off a gearing connection between a driving shaft of the motor and an output shaft of the speed reduction gear when the output encounters a certain level of resistance to rotation.

7 Claims, 4 Drawing Sheets

CLUTCH FOR WIPER MOTOR OVERLOAD

BACKGROUND OF THE INVENTION

1. Field of the Invention

The present invention relates in general to a windshield wiper, and more particularly to an electric motor assembly for the windshield wiper, which includes a motor part and a speed reduction gear part combined as a unit.

2. Description of the Prior Art

In order to clarify the task of the present invention, one conventional electric motor assembly for the wiper will be described with reference to FIG. 4 of the accompanying drawings.

Referring to the drawing, there is shown the conventional wiper motor assembly 100 including an electric motor part 101 and a speed reduction gear part 102 which are combined as a unit.

The motor part 101 comprises a motor housing 103 in which known motor parts are housed. A driving shaft 105 of an armature (not shown) extends outward from the motor housing 103 into a housing 104 of the speed reduction gear part 102. The shaft 105 in the housing 104 is provided with both first and second worms 105a and 105b which are spiralled in opposed directions. First and second identical compound gear members 106 and 107, each including a larger diameter helical gear 106a or 107a and a smaller diameter gear 106b or 107b, are rotatably arranged in the housing 104 at opposite positions with respect to the driving shaft 105. As shown, the helical gears 106a and 107a of the compound gear members 106 and 107 are meshed with the first and second worms 105a and 105b, respectively. It is thus to be noted that rotation of the driving shaft 105 in a certain direction rotates the first and second compound gear members 106 and 107 in the same direction at the same speed. A bearing structure 109 is further arranged in the housing 104 for bearing an output shaft 108 of the speed reduction gear part 102. An output or terminal gear 110 is secured to the output shaft 108 to rotate therewith and meshed with both the smaller diameter gears 106b and 107b. Although not shown in the drawing, the lower end of the output shaft 108 is projected outward from the housing 104 and connected through a known pivot-motion mechanism to wiper blade assemblies.

Thus, when the driving shaft 105 rotates due to energization of the motor 101, the output shaft 108 rotates in a given direction, thereby pivotally reciprocating the wiper blade assemblies to wipe an associated windshield.

However, due to its inherent construction, the above-mentioned conventional wiper motor assembly 100 has the following drawbacks.

That is, in winter, when the wiper blades have frozen to the windshield or a considerable amount of snow has laid on the wiper blades, energization of the electric motor 101 causes generation of great load or stress on the meshed parts of the speed reduction gear part 102. Under this condition, the teeth of the gears tend to break and in the worst case, the motor 101 breaks.

SUMMARY OF THE INVENTION

It is therefore an object of the present invention to provide an improved wiper motor assembly which is free of the above-mentioned drawbacks.

According to the present invention, there is provided a clutch means in the wiper motor assembly, so that when an abnormal load or stress is applied thereto, the clutch means disconnects a gear train between the motor and wiper blades.

According to the present invention, there is provided a wiper motor assembly which comprises an electric motor part having a driving shaft, a speed reduction gear part having an output shaft which is adapted to link to a wiper blade assembly, the speed reduction gear part being operatively connected to the electric motor part to rotate the output shaft at a speed lower than that of the driving shaft of the electric motor part, and clutch means incorporated with the output shaft to cut off a gearing connection between the driving shaft and the output shaft when the output shaft is encumbered with a certain external resistance.

DETAILED DESCRIPTION OF THE INVENTION

In the following, a wiper motor assembly 10 of the present invention will be described with reference to FIGS. 1 to 3B.

Figure 1:
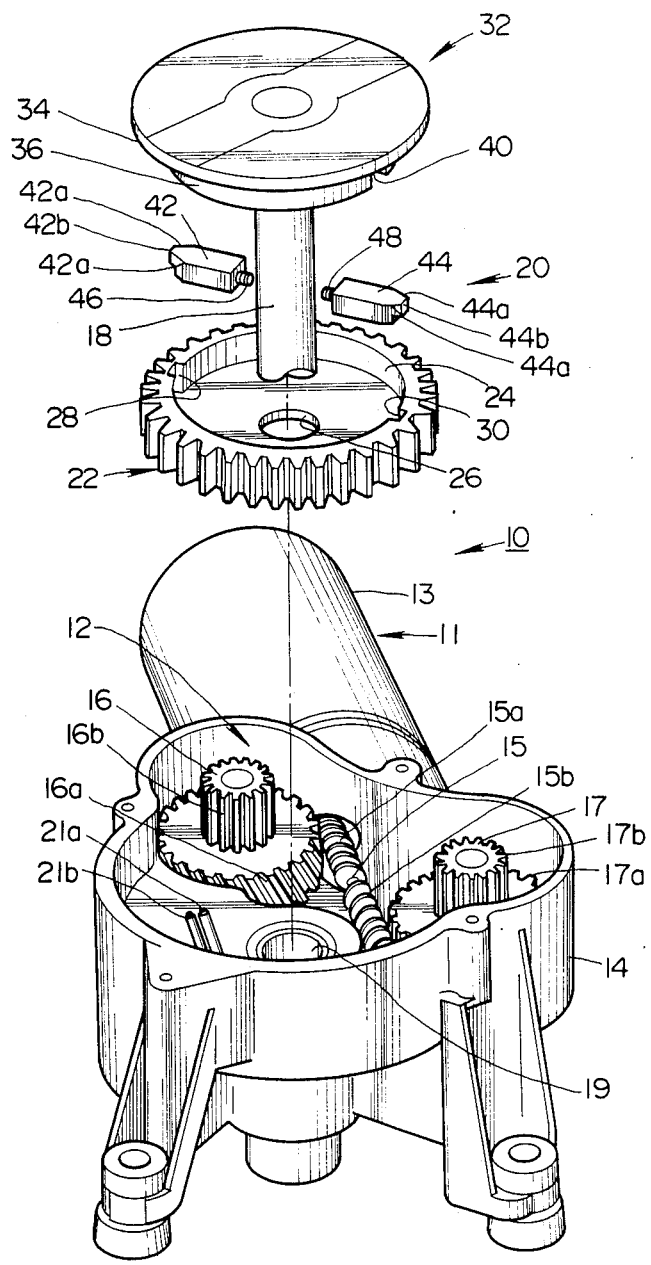
FIG. 1 is an exploded view of a wiper motor assembly according to the present invention.

Referring to the drawings, particularly FIG. 1, there is shown the wiper motor assembly 10 of the present invention, which includes an electric motor part 11 and a speed reduction gear part 12 which are combined as a unit.

The motor part 11 comprises a cylindrical motor housing 13 in which known motor parts are housed. A driving shaft 15 of an armature (not shown) extends outward from the housing 13 into a housing 14 of the speed reduction gear part 12. The shaft 15 in the housing 14 is provided with both first and second worms 15a and 15b which are spiralled in the opposed directions. First and second identical compound gear members 16 and 17, each including a larger diameter helical gear 16a or 17a and a smaller diameter gear 16b or 17b, are rotatably arranged in the housing 14 at opposite positions with respect to the driving shaft 15. The larger diameter helical gears 16a and 17a of the first and second compound gear members 16 and 17 are meshed with the first and second worms 15a and 15b, respectively. Thus, rotation of the driving shaft 15 in a certain direction rotates the first and second compound gear members 16 and 17 in the same direction at the same speed. A bearing structure 19 is arranged in the housing 14 for bearing an output shaft 18 wich extends from a below-mentioned clutch assembly 20. Stationary contacts 21a and 21b constitute a part of a known auto-parking mechanism of the wiper assembly.

The clutch assembly 20 comprises a terminal gear 22 which constitutes a part of the speed reduction gear part 12. The terminal gear 22 is formed with a coaxial circular recess 24. The bottom of the recess 24 is formed at its center portion with a circular opening 26 through which the above-mentioned output shaft 18 passes, so that relative rotation is permitted between the terminal gear 22 and the output shaft 18. The peripheral wall of the circular recess 24 is formed at diametrically opposed portions with axially extending grooves 28 and 30. These grooves 28 and 30 are the same in configuration.

A disc member 32 is coaxially connected to an upper end of the output shaft 18 to rotate therewith. The disc member 32 comprises a larger diameter lid portion 34 and a smaller diameter body portion 36 which are coaxial with each other. The smaller diameter body portion 36 is sized to be slidably received in the circular recess 24 of the terminal gear 22. As seen from FIG. 2B, the body portion 36 of the disc member 32 is formed at its diametrically opposed portions with radially extending grooves 38 and 40 which, when the disc member 32 assumes a given position relative to the terminal gear 22, mate with the grooves 28 and 30 of the terminal gear 22.

Figure 2A:
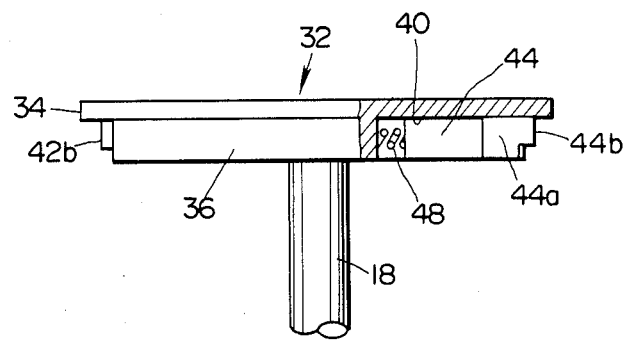
FIG. 2A is a partially cut front view of a disc member of a clutch assembly installed in the wiper motor assembly of the invention.
Figure 2B:
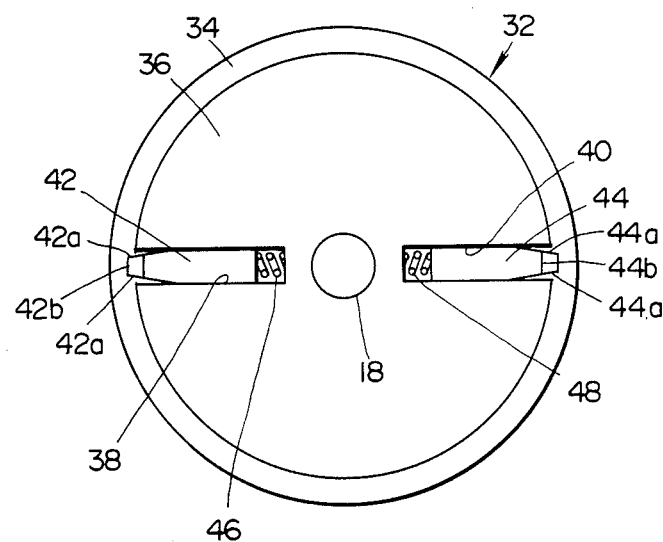
FIG. 2B is a back view of the disc member of the clutch assembly.

As seen from FIGS. 1 and 2B, two sliders 42 and 44 are slidably received in the grooves 38 and 40 of the disc member 32, which are biased radially outwardly by respective coil springs 46 and 48 disposed in the grooves 38 and 40. That is, each spring 46 or 48 is compressed between the inward end of the slider 42 or 44 and the inward wall of the associated groove 38 or 40. As is best seen from FIG. 2B, the leading end of each slider 42 or 44 is tapered to provide inclined side surfaces 42a or 44a and a tapered tip 42b or 44b. The tip 42b or 44b is so sized as to lockably engage with the groove 28 or 30 of the terminal gear 22. It is to be noted that the two sliders 42 and 44 are the same in construction.

Figure 3A:
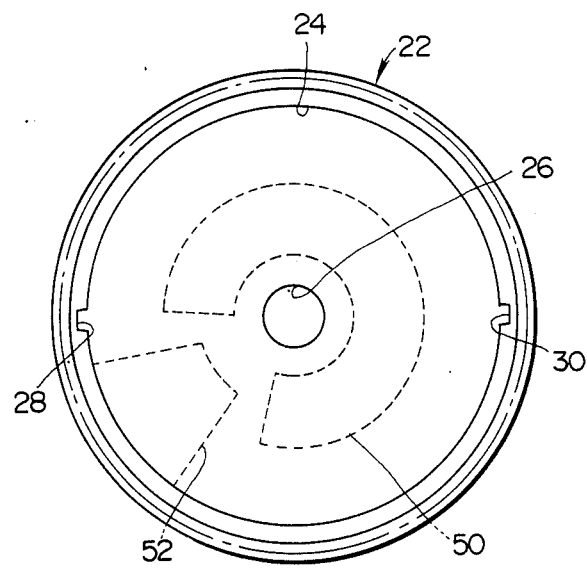
FIG. 3A is a plan view of a terminal gear of the clutch assembly.
Figure 3B:
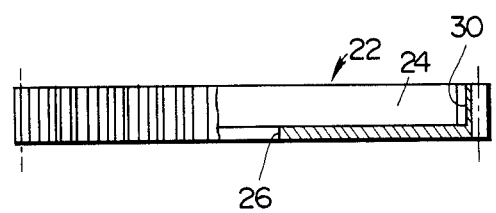
FIG. 3B is a partially cut front view of the terminal gear.
Figure 4:
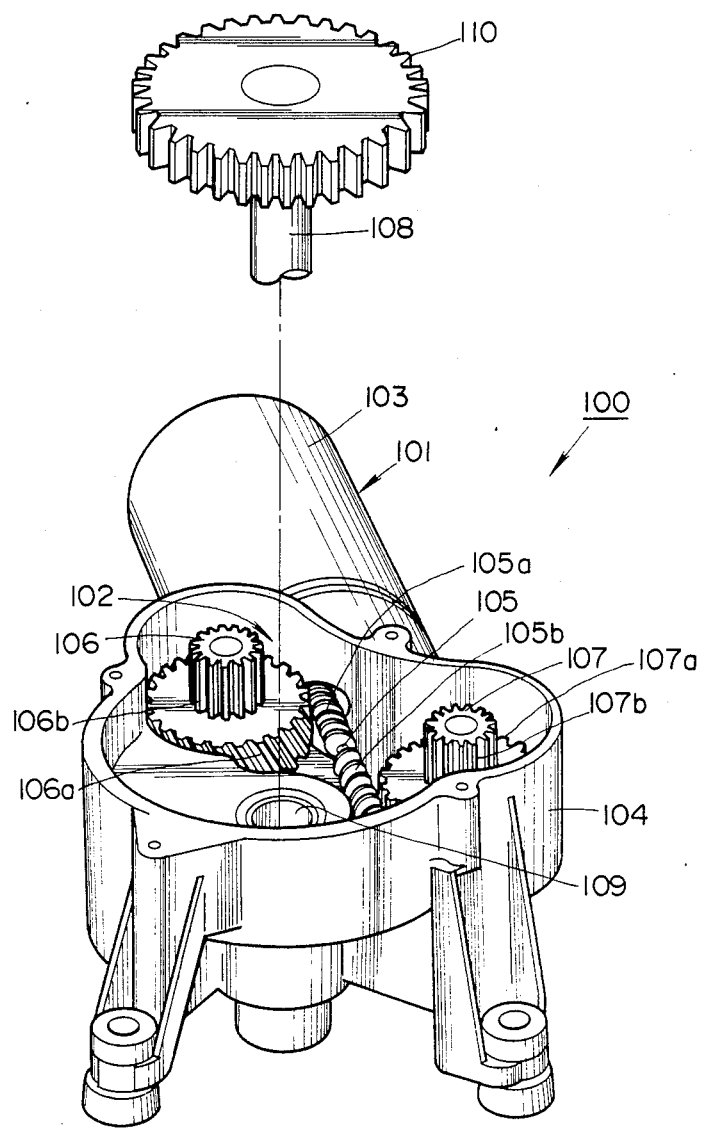
FIG. 4 is an exploded view of a conventional wiper motor assembly, which has been mentioned hereinabove.

As is seen from FIG. 3A, the terminal gear 22 is provided at its back surface with an arcuate conducting plate 50 and a trapezoidal conducting plate 52 which are incorporated with the afore-mentioned stationary contacts 21a and 21b to form the known auto-parking mechanism of the wiper assembly.

In assemblage, the body portion 36 of the disc member 32 is put into the circular recess 24 of the terminal gear 22 with the sliders 42 and 44 thrusted into the grooves 38 and 40 against the biasing springs 46 and 48. Then, the disc member 32 is rotated somewhat, relative to the terminal gear 22, to a position where the grooves 38 and 40 of the disc member 32 mate with the grooves 28 and 30 (or 30 and 28) of the terminal gear 22 to permit the tips 42b and 44b of the sliders 42 and 44 to project into the grooves 28 and 30 of the terminal gear 22 due to the work of the springs 46 and 48. With this, the terminal gear 22 and the disc member 32 are lockingly engaged with each other. It is to be noted that under this engaged condition, only the tapered tips 42b and 44b of the sliders 42 and 44 are put in the associated grooves 28 and 30 (or, 30 and 28) of the terminal gear 22. The engaged unit is then set in the housing 14 of the speed reduction gear part 12 having the terminal gear 22 meshed with both the smaller diameter gears 16b and 17b of the first and second compound gear members 16 and 17.

When, in operation, the electric motor 11 is energized to rotate the driving shaft 15, the rotation is transmitted through the worms 15a and 15b, the first and second gear members 16 and 17, the engaged clutch assembly 20, the output shaft 18, the known pivot-motion mechanism to the wiper blade assemblies.

When, due to for example freezing of the wiper blades to the windshield, the output shaft 18 encounters a certain resistance to rotation due to the obstacles preventing wiping movement of the wiper blades, a considerable stress is applied to the terminal gear 22 relative to the disc member 32 which is then fixed due to the wiper blade freezing. When the driving force of the motor 11 exceeds a certain threshold, one side wall of each groove 28 or 30 of the terminal gear 22 ride over the tip 42b or 44b of the slider 42 or 44 thrusting the same into the associated groove 38 or 40 of the disc member 32 against the biasing force of the spring 46 or 48, resulting in release of the terminal gear 22 from the fixed disc member 32. Thus, thereafter, energization of the motor 11 rotates only the driving shaft 15, the first and second compound gear members 16 and 17 and the terminal gear 22 without producing any abnormal stress on these parts. Accordingly, the afore-mentioned undesirable phenomena, such as breakage of the gears and motor, do not occur. It is to be noted that because of the considerable rotation speed of the terminal gear 22 and the provision of the inclined surfaces 42a and 44a of the sliders 42 and 44, locking action of the sliders to the grooves 28 and 30 of the terminal gear 22 is prohibited so long as the disc member 32 is kept fixed.

When the obstacles to wiper movement are removed, releasing the wiper blades from the windshield and thus permitting free movement of the parts arranged between the disc member 32 and the wiper blades, energization of the motor 11 brings about instantly locking engagement of the tips 42b and 44b of the sliders 42 and 44 with the grooves 28 and 30 of the terminal gear 22. With this, the clutch assembly 20 is engaged. Thus, thereafter, the driving force of the motor 11 is smoothly transmitted to the wiper blade assemblies to achieve wiping motion of the wiper blades.

What is claimed is:

1. A wiper motor assembly comprising:

an electric motor part having a driving shaft;

a speed reduction gear part having an output shaft which is adapted to link to a wiper blade assembly, said speed reduction gear part being operatively connected to said electric motor part to rotate said output shaft at a speed lower than that of said driving shaft of the electric motor part;

clutch means providing a connection between a terminal gear and said output shaft which connection is released when said output shaft encounters a certain resistance to rotation; and said clutch means comprising a disc member coaxially fixed to said output shaft to rotate therewith, said disc member having at least two radially-aligned grooves that open at the perimeter of said disc member;

two sliders slidably disposed in said grooves, respectively;

biasing means for biasing said sliders radially outwardly;

first means defining at said terminal gear a concentric circular recess into which a body portion of said disc member is rotatably and coaxially received; and second means defining two grooves in said circular recess each being positioned to complement the position of said grooves in said disc member so as to lockingly receive tips of said sliders as they extend beyond the perimeter of said disc member.

2. A wiper motor assembly comprising:

an electric motor part having a driving shaft;

a speed reduction gear part including a terminal gear constantly driven by said driving shaft at a reduced speed relative to that of said driving shaft, and an output shaft adapted to link to a wiper blade; and clutch means providing a connection between said terminal gear and said output shaft which connection is released when said output shaft encounters a certain resistance to rotation, said clutch means including a disc member coaxially fixed to said output shaft to rotate therewith, said disc member having at its diametrically opposed portions radially extending grooves, respectively, two sliders slidably disposed in said grooves, respectively, biasing means for biasing said sliders radially outwardly;

first means defining at said terminal gear a concentric circular recess into which a body portion of said disc member is rotatably and coaxially received, and second means defining at diametrically opposed portions of said circular recess two grooves each being so sized and constructed as to lockingly receive a tip of the associated slider.

3. A wiper motor assembly as claimed in claim 2, in which the leading end portion of each slider is tapered to provide said tip with inclined side surfaces.

4. A wiper motor assembly as claimed in claim 3, in which said circular recess of said terminal gear is formed with a center opening through which said output shaft passes.

5. A wiper motor assembly as claimed in claim 4, in which said grooves of said disc member are formed in a body portion thereof.

6. A wiper motor assembly as claimed in claim 5, in which said biasing means comprises a coil spring which is disposed in each of the grooves of said disc member.

7. A wiper motor assembly as claimed in claim 2, in which said grooves of said terminal gear are formed in a cylindrical inner wall defining said circular recess.

* * * * *